(No Model.)
J. A. SMITH.
CORD COUPLING.
No. 556,649.　　　　　　　Patented Mar. 17, 1896.
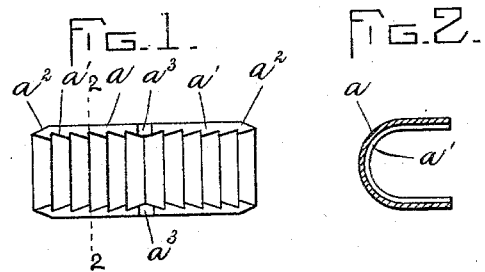
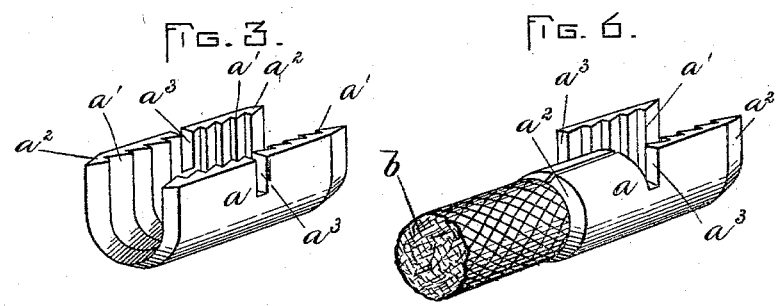
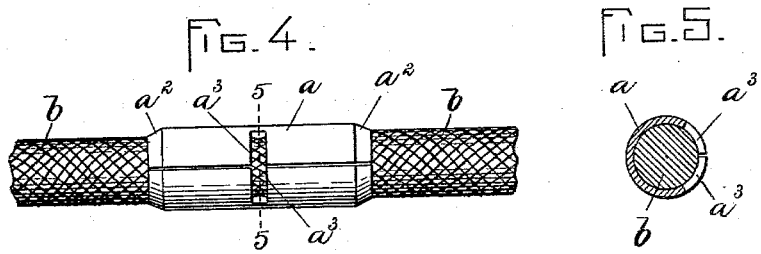
WITNESSES:
INVENTOR:

UNITED STATES PATENT OFFICE.

JAMES A. SMITH, OF HOLBROOK, MASSACHUSETTS.

CORD-COUPLING.

SPECIFICATION forming part of Letters Patent No. 556,649, dated March 17, 1896.

Application filed December 16, 1893. Serial No. 493,804. (No model.)

*To all whom it may concern:*

Be it known that I, JAMES A. SMITH, of Holbrook, in the county of Norfolk and State of Massachusetts, have invented certain new and useful Improvements in Cord-Couplings, of which the following is a specification.

This invention has for its object to provide a simple and effective device for coupling together the ends of pieces of cord or other flexible material, and is particularly intended for use in connecting the ends of sections or lengths of cord used in store-service systems, such as the Lamson.

The invention consists of a coupling composed of a flexible metal socket open at one side and both ends and formed as a trough adapted to receive the ends of two pieces of cord and transversely slotted from the edges of the said trough partly across the socket to divide the outer portions of the socket into sections, each adapted to be engaged independently with a cord, the inner surface of said socket being provided with teeth or corrugations, so formed that when the socket is closed or compressed upon the ends of the cord the teeth will engage the said ends and hold them firmly.

Of the accompanying drawings, forming part of this specification, Figure 1 represents a side view of my improved coupling before it is closed on the cord. Fig. 2 represents a section on line 2 2 of Fig. 1. Fig. 3 represents a perspective view. Fig. 4 represents a side view showing my improved coupling in place on two lengths of cord. Fig. 5 represents a section on line 5 5 of Fig. 4. Fig. 6 represents a perspective view showing the socket attached to the end of only one cord.

The same letters of reference indicate the same parts in all the figures.

In carrying out my invention I make a flexible metal socket $a$, which is in the form of a trough open at one side and at both ends, so that the ends of two pieces $b\ b$ of cord or other material to be coupled together may be readily inserted in it.

In Figs. 1, 2, and 3 I show the socket substantially U-shaped in cross-section and comprising the continuous semicircular back portion and the two parallel side portions. It may be made of any suitable flexible metal, Swedish iron being preferred. On the interior of the socket I form teeth or corrugations $a'$, formed to engage and securely hold the ends of the pieces $b\ b$ when the socket is closed upon said ends. I prefer to make the teeth at one side of the longitudinal center of the socket oppositely pitched from those at the other side of said center, as shown in Fig. 1, although I do not limit myself to this form.

The socket is preferably made of malleable or annealed metal, so that it can be closed and caused to surround the cord ends, as shown in Figs. 4 and 5, and when so closed will remain closed, thus firmly holding said ends.

The socket may be closed by external pressure suitably applied, said pressure being sufficient to embed the teeth $a'$ firmly in the inclosed material. The ends of the socket are preferably beveled, as shown at $a^2\ a^2$, and said beveled ends are preferably pressed inwardly when the socket is being closed, thus preventing the formation of shoulders at the ends of the socket.

$a^3\ a^3$ represent transverse slots extending from the edges of the side portions of the socket partly across the same at about the middle of its length. Said slots convert each of the said portions of the socket into two sections or ears and enable the socket to be engaged with one of the cords before it is engaged with the other cord by bending inwardly one pair of ears, the other pair being left open, as shown in Fig. 6. This construction greatly enhances the convenience of the device, as will be readily seen. Each pair of ears and the corresponding portion of the back constitute a practically complete tube.

This improved coupling may be employed to connect pieces of belting, rope, &c., and used for any purpose to which it is adapted.

I claim—

As an improved cord-coupling device, the U-shaped internally-corrugated socket comprising the continuous semicircular back portion, and the side portions each having a central slot $a^3$, said slots converting the side portions into two pairs of ears each adapted to be bent independently to complete one end of the socket, each pair of ears forming in connection with the corresponding part of the back a tubular socket adapted to surround a piece of cord, the said coupling being free from external projections other than the ears, whereby a smooth exterior is formed when the ears are bent down.

In testimony whereof I have signed my name to this specification, in the presence of two subscribing witnesses, this 9th day of December, A. D. 1893.

JAS. A. SMITH.

Witnesses:
C. F. BROWN,
A. D. HARRISON.